United States Patent [19]

Baer et al.

[11] Patent Number: 4,872,177
[45] Date of Patent: * Oct. 3, 1989

[54] LASER DIODE PUMPED SOLID STATE LASER

[75] Inventors: Thomas M. Baer, Mountain View; Mark S. Kierstead, San Jose, both of Calif.

[73] Assignee: Spectra-Physics, San Jose, Calif.

[ * ] Notice: The portion of the term of this patent subsequent to Mar. 24, 2004 has been disclaimed.

[21] Appl. No.: 214,020

[22] Filed: Jun. 30, 1988

Related U.S. Application Data

[63] Continuation of Ser. No. 35,530, Apr. 7, 1987, Pat. No. 4,756,003, which is a continuation-in-part of Ser. No. 811,546, Dec. 19, 1985, Pat. No. 4,656,635, which is a continuation-in-part of Ser. No. 730,002, May 1, 1985, Pat. No. 4,653,056.

[51] Int. Cl.$^4$ .................................... H01S 3/091
[52] U.S. Cl. ........................... 372/75; 372/12; 372/13; 372/21; 372/22; 372/27; 372/39; 372/108
[58] Field of Search .............. 372/75, 39, 71, 108, 372/12, 69, 41, 9, 27, 12, 13

[56] References Cited

U.S. PATENT DOCUMENTS

| | | | |
|---|---|---|---|
| 3,982,201 | 9/1976 | Rosenkrantz et al. | |
| 4,035,742 | 7/1977 | Schiffner | |
| 4,383,318 | 5/1983 | Barry | 372/6 |
| 4,389,790 | 8/1983 | Righini et al. | 350/96 |
| 4,618,957 | 10/1986 | Liu | 372/22 |
| 4,642,809 | 2/1987 | Petheram | 372/66 |
| 4,710,940 | 12/1987 | Sipes, Jr. | 372/75 |
| 4,731,787 | 3/1988 | Fan et al. | 372/22 |
| 4,739,507 | 4/1988 | Byer et al. | 372/22 |
| 4,756,003 | 7/1988 | Baer et al. | 372/75 |

OTHER PUBLICATIONS

Gallium Arsenide Diode Nd:YAG Laser, Rosenkrantz (Article).
Efficient and Damage-Resistant Tunable CW Dye Laser, Jacobs et al. (Article).
Single-Diode End-Pumped Nd:YAG Laser, Draeger (Article).
Injection Luminescent Pumping of Calcium Fluoride Ca $f_2$:U$^{3+}$ With GaAs Diode Lasers, Keyes et al. (Article).
GaAs, $-xPx$ Diode Pumped NAG:ND Lasers, Ostermayer, Jr. (Article).
Room Temperature CW Operation of a GaAs $1-xPx$ Diode-Pumped YAG:Nd Laser, Ostermayer, Jr.[1] et al. (Article).
Monolithic, Unidirectional Single-Mode Nd:YAG Ring Laser, Kane et al. (Article).
Efficient, Frequency-Stable Laser-Diode-Pumped Nd:YAG Laser, Kane et al. (Article).
FM-Mode Locked Nd$_{0.5}$La$^{0.5}P_5$O$_{14}$ Laser, Chinn et al. (Article).
Spike-Mode Oscillations in Laser-Diode Pumped LiNdP$_4$O$_{12}$ Lasers, Kubodera et al. (Article).

(List continued on next page.)

Primary Examiner—Leon Scott, Jr.
Attorney, Agent, or Firm—Lyon & Lyon

[57] ABSTRACT

A neodymium or other rare earth doped solid state laser is pumped by a matched high efficiency laser diode, including a diode array and a multi-spatial mode extended emitter diode, resulting in a compact, high efficiency and long lifetime laser assembly. The cavity mode volume is matched to a region of absorption in the pumping volume formed by the focused diode beam. Output is in the near infrared range, but can be converted to the visible spectrum by an intra-cavity frequency doubler. A doubling crystal, e.g., KTP, is placed in an optimum location in the laser cavity. Polarization of the beam for frequency doubling may be achieved by using a birefringent material for the rod or by stressing a non-birefringent rod. An amplitude noise suppression etalon may also be placed at an optimum position in the laser cavity. A folded cavity configuration produces a pair of beam waists in the cavity. Pulsed operation can be produced by means of a Q-switch.

19 Claims, 5 Drawing Sheets

OTHER PUBLICATIONS

Highly Efficient Neodymium:Yttrium Aluminum Garnet Laser End Pumped by a Semiconductor Laser Diode Array, Sipes (Article).
Room-Temperature CW Operation of an Efficient Miniaturized Nd:YAG Laser End-Pumped by Super-Luminescent Diode, Washio et al. (Article).
Intracavity Second Harmonic Generation in a Nd Pentaphosphate Laser, Chinn et al. (Article).
Miniature Nd-Pentaphosphate Laser With Bonded Mirrors Side Pumped With Low Current Density LED's, Bodin et al. (Article).
Low-Current-Density LED-Pumped Nd:YAG Laser Using a Solid Cylindrical Reflector, Farmer et al. (Article).
Efficient Frequency-Doubled Single Frequency Nd:YAG Laser, Culshaw et al. (Article).
Low Threshold, Transversely Excited Nd:$P_5O_{14}$ Laser, Chin et al. (Article).

LASER DIODE PUMPED SOLID STATE LASER

This application is a continuation of Ser. No. 035,530, filed Apr. 7, 1987, which is a continuation-in-part of Ser. No. 811,546, filed Dec. 19, 1985, U.S. Pat. No. 4,656,635 which is a continuation-in-part of Ser. No. 730,002, filed May 1, 1985, now U.S. Pat. No. 4,653,056 issued Mar. 24, 1986

BACKGROUND OF THE INVENTION

Field Of The Invention

This invention relates generally to lasers, and more particularly to solid state lasers such as Nd:YAG lasers.

A large number of different kinds of solid lasers have been discovered, distinguished from one another by host material, by active lasing ions with which the host is doped, and by output characteristics. Of these, mainly ruby, Nd:YAG and Nd-doped glass laser systems are of major importance in industrial and laboratory environments. They are particularly useful for materials processing applications which include drilling, welding, cutting and scribing.

A wide variety of Nd:YAG lasers and industrial systems are currently manufactured. Their usefulness and versatility is due in part to the fact that they can be operated in a number of different modes.

However, Nd:YAG lasers have proved to be relatively inefficient and have relatively short lifetimes due to limitations of their pumping sources which are typically arc or incandescent lamps, or light-emitting diodes.

Pumping by arc or incandescent lamps is undesirable due to limited lifetimes. The lamps themselves have lifetimes of a few hundred hours and need periodic replacement. Moreover, they generate unnecessary and damaging ultraviolet radiation which tends to degrade the YAG material itself.

Pumping by light-emitting diodes is undesirable because of limited power and focusability and low efficiency. The wavelength of the emitted light is very broad and does not match the Nd:YAG absorption line. Additionally, light-emitting diodes have a broad emission spectrum which provides inherent limitations when they are utilized as pumping sources for Nd:YAG lasers.

Exemplary Nd:YAG lasers pumped by these sources are disclosed by: F. W. Ostermayer, Jr., *Appl. Phys. Lett.*, Vol. 18, No. 3 (1971) p. 93; N. P Barnes, *J. Appl. Physics*, Vol. 44, No. 1 (1973) p. 230; R. B. Chesler and D. A. Draegert, *Appl. Phys. Lett.*, Vol. 23, No. 5 (1973) p. 235; R. B. Allen and S. J. Scalise, *Appl. Phys. Lett.*, Vol. 14, No. 6 (1969) p. 188; and W. Culshaw, J. Kanneland and J. E. Peterson, *J. Quant. Elect.*, Vol. QE-10, No. 2 (1974) p. 253.

However, there exists a need for a more efficient, longer life Nd:YAG laser for low to high power applications. A need also exists for a frequency-doubled Nd:YAG laser which has a long lifetime, is efficient and suitable for applications in the visible light range as well as other wavelengths. There is also a need for a laser with low amplitude noise. A need further exists for a laser with a pulsed output. It would also be desirable to produce a family of lasers using other neodymiumdoped or other rare earth doped solid state materials in addition to Nd:YAG (hereafter referred generally to as RE:solid).

BRIEF DESCRIPTION OF THE INVENTION

Accordingly, an object of the present invention is to provide an intra-cavity frequency doubled RE:solid state laser having high efficiency and a long lifetime.

Another object of the invention is to provide an intracavity frequency doubled RE:solid laser which is compact.

Yet another object of the invention is to provide a laser diode pumped intra-cavity frequency doubled RE:solid laser having high efficiency, a long lifetime and which is relatively compact.

Another object of the invention is to provide a RE:solid laser having low amplitude noise.

A further object of the invention is to provide a RE:solid laser having a pulsed output.

Another object of the invention is to provide a laser diode pumped RE:solid laser with high efficiency, long lifetime, and relatively compact design, which is not frequency doubled.

A further object of the invention is to provide a cavity design for a RE:solid laser which allows efficient pumping by a high power laser diode array and provides efficient intra-cavity frequency doubling to the visible.

Yet another object of the invention is to provide a means for controlling the polarization of the RE:solid laser to allow efficient intra-cavity frequency doubling.

Still another object of the invention is to provide a means of controlling the frequency of a laser diode pump source utilized with a RE:solid laser.

Another object is to provide efficient methods for producing RE:solid laser beams both in the visible spectrum and the nearinfrared range, with a RE:solid rod pumped by a laser diode array.

These and other objects of the present invention are achieved by providing a high efficiency, laser diode pumped, compact RE:solid laser which comprises a RE:solid laser rod having a front end and a back end; a housing with means for holding the laser rod in a fixed position therein with its front end forward; a laser diode or diode array for pumping the laser rod, having an output frequency sufficiently matched to the rod to pump the rod, and secured in the housing behind and in alignment with the rod; an output coupler means including a mirrored surface for a front end of a laser cavity and a rear mirror means for a back end of a laser cavity, with the rod positioned within the cavity. A frequency doubler is positioned within the laser cavity to receive a suitably polarized output beam of the laser rod to halve its wavelength and double its frequency; if necessary polarization means are included in the cavity for polarizing the laser beam in order to facilitate efficient frequency doubling. In addition to Nd:YAG, other preferred materials for the rod include Nd:YLF, Nd:YAP and Nd:YALO.

In preferred embodiments, particular features of the laser diode array pumped system of the invention are included for highly efficient and compact construction, as well as efficiency in laser pumping, frequency doubling and polarization of the beam, suppression of amplitude noise, and pulsed output operation.

The present invention provides an intra-cavity frequency doubled RE:solid laser which allows efficient pumping by a high power laser diode array. The present invention also provides an expansion of the lasing volume to match the focussed image of a laser diode array. An intra-cavity waist is disclosed which provides efficient frequency doubling. In a preferred folded cavity configuration, a pair of intra-cavity waists are provided.

Laser diode arrays provide a great deal of power despite the limited focusability of the output beam. With multi-strip arrays, e.g. having ten emitters in a row, each having an elliptical beam configuration, the compilation of the emitted beams adds up to a rectangular geometrical beam which possesses too much spatial structure. Advantageously, the present invention overcomes this disadvantage by providing a cavity designed to expand the lasing volume to match the focussed image of the laser diode arrays and therefore, their high power efficiency can be utilized despite their poor focusing qualities.

The invention is also advantageous in some applications without frequency doubling, yielding an efficient near infrared laser beam from low to high power.

In methods according to the invention a RE:solid laser rod is pumped by a laser diode to produce an output in the near infrared range which may be doubled with intra-cavity frequency doubling to produce a visible beam. Polarization of the beam is performed by the laser rod itself or else intra-cavity for efficient frequency doubling.

Amplitude noise is suppressed by means of an etalon placed in the cavity, or alternatively by a ring cavity configuration, or a pair of quarter wave plates. Pulsed operation is obtained using a Q-switch.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF A PREFERRED EMBODIMENT

Figure 1:
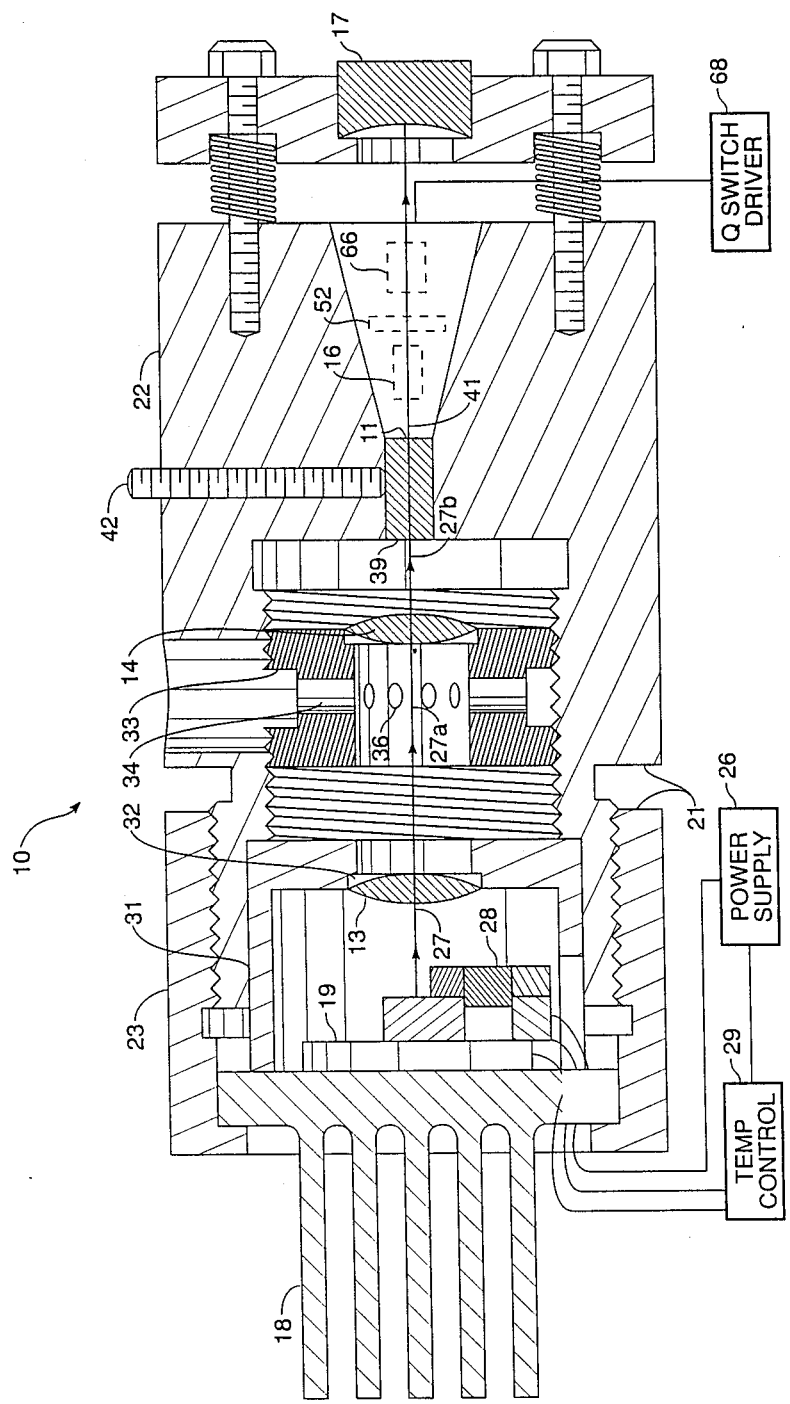
FIG. 1 is a sectional longitudinal view of a laser diode pumped solid state laser assembly according to the invention, including a laser rod, laser diode, laser cavity, housing, cooling device and other associated components, and showing (in dotted lines) the additional features of a frequency doubler, noise suppression etalon, and Q-switch.

In the drawings, FIG. 1 shows a neodymium-YAG laser assembly 10 in a longitudinal sectional view. The major components of the laser 10 are a neodymium-YAG laser rod 11 and a laser diode 12 toward the rear of the assembly. The assembly includes lenses 13 and 14 through which the laser diode beam passes en route to the laser rod 11, a frequency doubler 16 (dashed lines) at the output side of the laser rod, an output coupler 17 (which comprises the front surface of a mirror) at the front end of the assembly, a heat sink 18 at the rear of the assembly, a Peltier cooler 19 between the diode 12 and the heat sink 18, and a housing 21, which may comprise front and rear housing components 22 and 23, to which all of these operating components are attached. Also included with the assembly are a temperature control 24 and a power supply 26.

The power supply 26 delivers electrical power to the laser diode 12, causing it to emit a laser diode beam 27 and creating some waste heat which is removed by the Peltier cooler 19 and the heat sink 18. The temperature control 24 is shown connected to the Peltier cooler 19 to regulate the temperature of the diode and to tune it by temperature to the correct wavelength for pumping of the Nd:YAG laser rod 11. The laser diode 12, which may be a Gallium aluminum arsenide (GaAlAs) laser diode array, as identified as Model No. 2410 manufactured by Spectra Diode Labs of 3333 North First Street, San Jose, Calif., is manufactured to be close to the proper wavelength for excitation of the Nd:YAG rod, but temperature control is required for precise "tuning" of the diode's output beam 27. In one preferred embodiment, the laser diode array 12 emits a beam substantially at 0.808 micron wavelength, the proper wavelength for pumping of the Nd:YAG rod 11. Such a laser diode has an efficiency of about 20%.

As indicated somewhat schematically in the drawing, the diode 12 may be retained in the housing by a diode clamp 28.

A fixed lens mount 31 is secured in a portion of the housing, which may be a rearward end flange 32 of the forward housing component 22, and retains the lens 13 in fixed position therein. The fixed lens 13 acts as a collimating lens to convert the diverging beam 27 from the laser diode array 12 into substantially a parallel beam.

The collimated laser diode beam 27a then passe through the lens 14, which is a focusing lens, for focusing the beam into the back end of the Nd:YAG crystal 11. As indicated, the focusing lens 14 is adjustable, mounted on an adjustable lens spool 33 which is rotatable within a threaded bore as shown, to adjust the fore and aft position of the lens 14. An opening 34 preferably is provided in the forward housing component 22 for access to the adjustable lens spool 33 to rotate it via a series of holes 36 in the lens spool.

The focused, converging laser diode beam 27b enters the Nd:YAG laser rod 11 and excites the neodymium atoms in the rod to produce a laser beam in the near infrared range.

Figure 4:
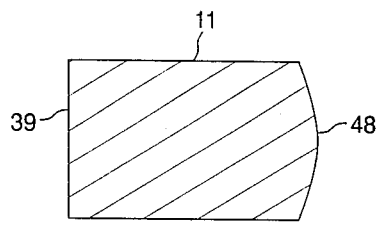
FIG. 4 is an enlarged sectional view of the laser rod of the laser system, to indicate special surfaces of the rod.

A laser cavity for the Nd:YAG laser rod is defined between the output coupler 17, which comprises a partially mirrored surface, and an opposing rear mirror located somewhere to the rear of the Nd:YAG rod 11. In one embodiment of the invention, the rear surface 39 of the laser rod 11 itself is coated to be highly reflective at 1.06 micron, serving as the rear mirror of the laser cavity. This is also indicated in FIG. 4, showing he Nd:YAG rod 11 in enlarged view. It should be noted that the term "mirrored" as used herein and in the appended claims, includes partially mirrored.

Forward of the Nd:YAG laser rod 11 is the intracavity frequency doubler 16 which preferably, but not necessarily, is included in the assembly 10. The emerging laser beam 41 from the Nd:YAG laser rod 11 passes through the frequency doubler 16 where its wavelength is halved, doubling its frequency. Preferably, the frequency doubler 16 is a crystal which is a near-ideal frequency doubling element for this purpose, selected from a group including KTP, $LiNbO_3$ $LiIO_3$. A KTP crystal is a suitable and preferred frequency doubler, being an efficient doubling element in the wavelengths concerned with this invention. The power output of the KTP crystal frequency doubler increases approximately quadratically with increases in the 1.06 micron laser beam power, so that the efficiency of a system utilizing this frequency doubler is much greater at high powers than at low powers.

The laser beam should be polarized within the laser cavity for maximizing efficiency in frequency doubling. The intracavity frequency doubler 16 only converts incident light polarized along a certain axis. Unpolarized light will pass through doubler 16 along an orthogonal axis and not be frequency converted. Therefore the incident laser beam should be polarized to coincide with the axis of doubler 16. This can be accomplished in several different ways.

One preferred method according to the present invention is to simply apply a transverse stress to the Nd:YAG rod 11, which has the effect of creating a beam polarization which is along the axis of the stress. The axis of the stress and resulting beam polarization should be oriented relative to the conversion axis of doubler 16 to maximize conversion.

According to the present invention, the transverse stressing of the laser rod 11 may be accomplished by a simple set screw or stressing screw 42 threaded into the housing component 22 as shown. Since it is important that the transverse stress on the laser rod be substantially constant, it may be beneficial to add a strong compression spring to the assembly including the set screw 42, for example a Belleville washer, between the set screw and the laser rod 11. Although this is not shown in FIG. 1, a schematic indication of a Belleville washer 43 contacted by the set screw 42 is included in FIG. 2a, with the force of the Belleville washer 43 applied to the side of the Nd:YAG rod 11 by a spacer member 44.

Figure 2A:
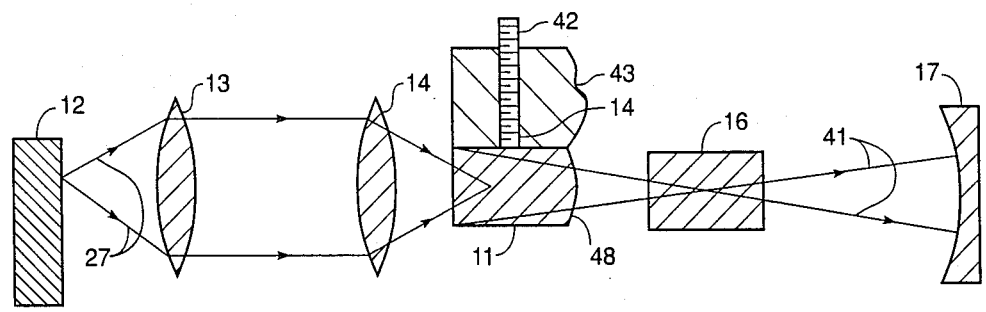
FIGS. 2a–c are schematic sectional views of the system with various alternate means for polarizing the laser beam.
Figure 2B:
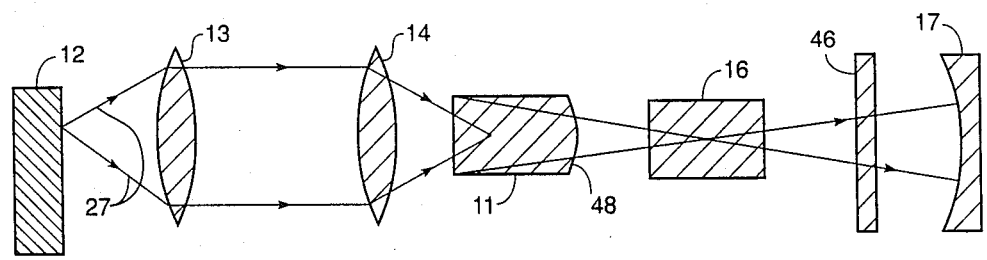
Figure 2C:
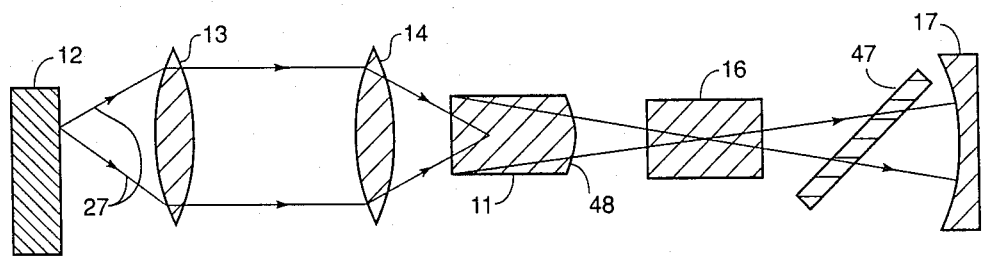

FIGS. 2a-c, show schematically the major components of the laser diode and Nd:YAG laser assembly, and indicate three different systems for establishing a polarization in the laser beam 41. In FIG. 2a, as discussed above, the transverse stressing of the Nd:YAG rod itself is illustrated. FIG. 2b shows an alternative method wherein a quarter waveplate 46 is used, between the frequency doubler 16 and the front end mirrored surface 17. FIG. 2c shows the use of a Brewster plate 47, i.e., a piece of glass oriented at Brewster's angle. It is important to control the polarization within the laser cavity.

Another important feature of the invention relates to beam shaping in the laser cavity. As indicated in FIGS. 1 and 2a-c, the partially mirrored surface 17 at the output coupler preferably is concave. It is also indicated in these figures and in FIG. 4 that the front end surface 48 of the Nd:YAG laser rod 11 may be convexly curved. The curvature of the front of the Nd:YAG rod, which may be a spherical curvature of about 15 millimeters radius, in effect puts a lens in the laser cavity which tends to focus the radiation. Cooperating with this lens in the shaping of the beam within the cavity is the output coupler mirror 17.

Figure 3:
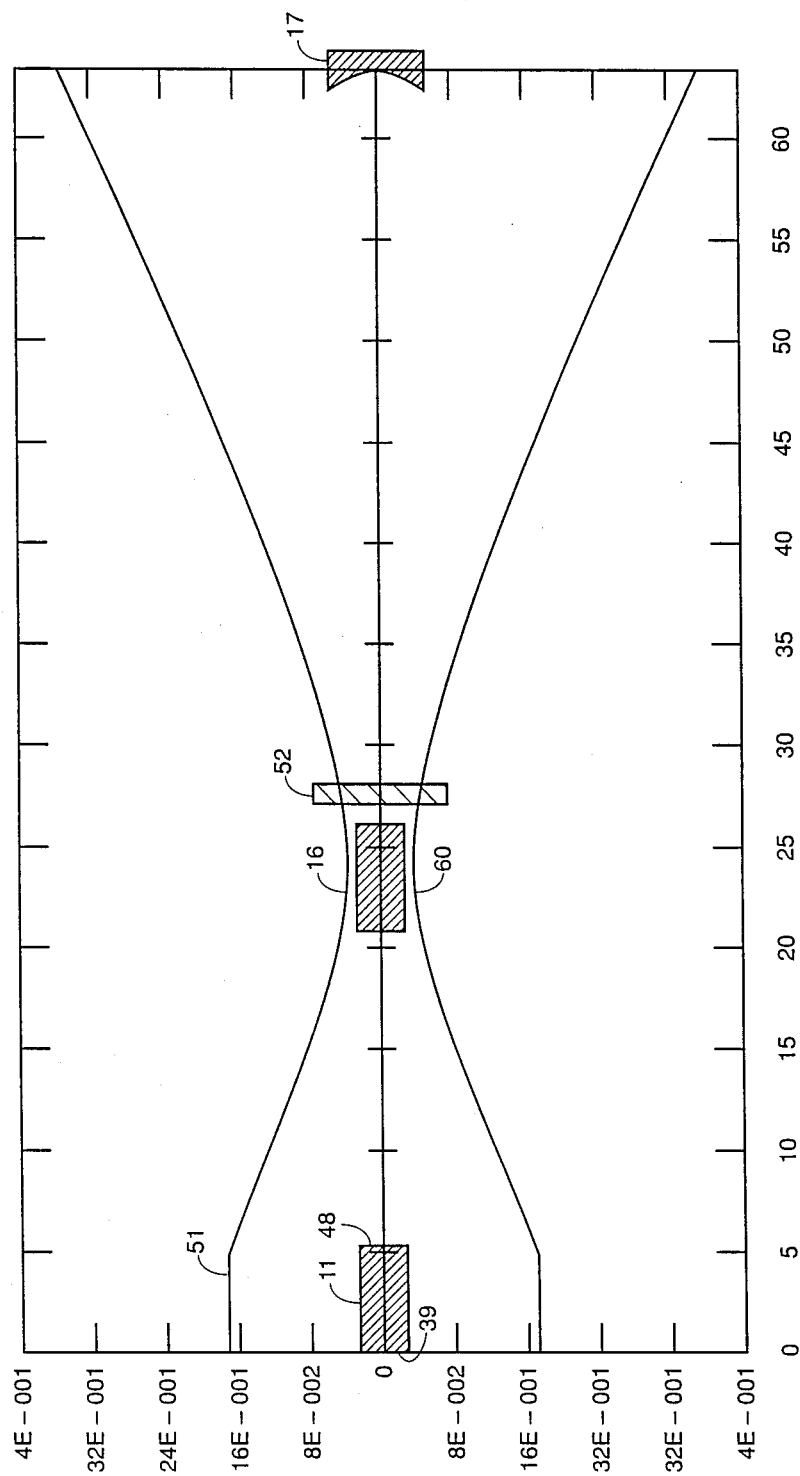
FIG. 3 is a graphic representation of the laser beam shape within the laser cavity, with a beam waist formed between the laser rod and an output coupler at the front end of the assembly, also showing the position of the optical elements (not to scale).

The graph of FIG. 3 shows generally the laser beam 41 in profile within the laser cavity. It illustrates beam shaping to form a beam waist 50, that is, a narrowed portion of the laser beam as it resonates within the laser cavity between the two mirrored surfaces. In the representation of FIG. 3, the rear mirrored surface is assumed to be the flat back surface 39 of the Nd:YAG laser rod.

Varying of the radius of curvature of the lens surface 48 at the front of the laser rod has been found to affect the size of the beam waist 50. A tighter radius of curvature will produce a smaller waist which enhances the frequency doubling process. It has been found advantageous for efficiency of the laser, according to the present invention, to reduce the beam waist 50 to the minimum diameter practicable relative to other design considerations, including permissible ranges of radius at the front end 48 of the laser rod, and to place the KTP frequency doubling crystal at the beam waist. A minimum practicable waist diameter may be about 40 microns for the embodiment shown.

Another aspect of beam shaping according to the present invention relates to matching of beam volume of the resonating beam inside the YAG rod to the size of the laser diode beam exciting the YAG crystal. The combination of the concave output coupler mirror 17 and the lens-shaped end 48 at the front of the YAG rod, with the back 39 of the rod mirrored, enables the beam size at a location 51 on the graph of FIG. 3, i.e. within the YAG rod, to be adjusted to the appropriate volume. The beam focused from the laser diode into the YAG crystal must overlap the beam volume 51 inside the laser rod, for efficient excitation of the neodymium atoms within the rod. The pumping volume must be generally the same as the lasing volume. If the laser beam volume within the YAG crystal is too small, the pump volume from the laser diode beam does not match it well and this results in a reduction in the laser's efficiency.

The combination of the lens-shaped end 48 on the laser rod, the output coupler mirror 17 and its radius of curvature, the distance back from the lens 48 to the rear cavity mirror 39 (preferably on the flat back end surface of the YAG rod), which preferably is about 5 millimeters, and the placing of the KTP doubling crystal at the beam waist 50, which is of minimum practicable size, results in a highly efficient frequency doubled laser output. The radius of curvature of the concave mirror 17 at the output coupler, in one preferred embodiment of the invention, preferably is about 37 millimeters. The distance between this concave mirror and the forward end of the KTP crystal may be about 31 millimeters. A KTP crystal of about 5 millimeters length may be used. From the rear of the KTP crystal back to the lens-shaped front of the YAG rod may be about 22 millimeters. As stated above, the YAG rod itself may be of about 5 millimeters length, with a 15 millimeter radius of curvature of the front-end lens 48.

It should be understood that the mirror locations shown and described herein are preferred, but may vary. For example, the rear mirror surface of the laser cavity may comprise a mirror placed somewhere behind the back surface 39 of the Nd:YAG laser rod.

With the laser diode array pumped Nd:YAG laser assembly of the invention, it has been found that for visible low power laser beam output, efficiencies of about 0.5% to 1.0% may be achieved. For example, with about one watt electrical power supplied to the laser diode, which has an efficiency of about 20%, the laser diode output beam will have a power of about 200 milliwatts. In general at these pump levels the 1.06 micron output is approximately 30% of the diode laser output, so that the 1.06 micron output beam has a power of about 60 milliwatts. Thus an efficiency of approximately 5% is achieved for output at 1.06 micron. For efficiency frequency doubling the output coupler is coated to be highly reflective at 1.06 micron and highly transmissive at 0.532 micron. At 200 milliwatts pump levels the intra-cavity 1.06 micron intensity is approximately 10 watts. At this power level the doubling efficiency of the KTP is sufficient to give approximately 10 milliwatts output at 0.532 micron.

At substantially higher power, for example 10 watts of input to the laser diode, a 2-watt output diode beam excites the YAG rod to emit a laser beam of about 600 milliwatts. At this higher power, the frequency doubling crystal is more efficient, and an output in the visible range of about 100 milliwatts can be achieved. Thus, one percent efficiency in a medium-power visible laser is achieved.

At high-power output, the Nd:YAG laser of the invention is considerably more efficient. For example, if 40 watts are input to the laser diode, a laser beam of about 2.4 watts is frequency doubled, and at this power the KTP frequency doubler converts nearly 100 percent of the 1.06 micron output light to the visible. Thus, an output beam of over two watts in the visible range can be achieved, at up to 5% to 6% efficiency.

The system of the invention is also advantageous as producing a laser in the near-infrared range. In this form of the invention, the frequency doubler 16 (in dashed lines in FIG. 1) is eliminated. Thus, the efficiency of the system is limited only by the approximately 20% efficiency of the laser diode, and by the approximately 30% efficiency of the Nd:YAG laser rod itself, for an overall efficiency of nearly 6% regardless of power level.

In one form of such an infrared laser, the ends of the Nd:YAG laser rod may form the two mirrors of the laser cavity. Thus, each end is partially mirrored, defining a cavity within the rod itself. An extremely efficient near-infrared laser thereby results, even more compact than the system shown in FIG. 1, since the output coupler is integrated with the laser rod.

Figure 2D:
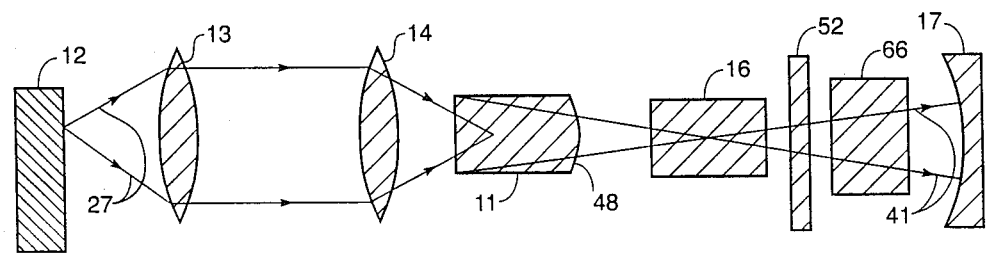
FIG. 2d is a schematic sectional view showing a system with etalon and Q-switch.

A further problem that occurs in a miniaturized, laser diode pumped, intra-cavity frequency doubled Nd:YAG laser as previously described is the generation of amplitude noise, including large amplitude spikes, which prevent or limit use in applications requiring a highly stable or constant output. Although the short laser cavity results in longitudinal modes which are relatively widely spaced, the gain curve is generally sufficiently broad to permit multiple longitudinal modes to oscillate in the laser cavity. The combination of these multiple modes produces amplitude noise. In order to reduce or eliminate amplitude noise, an amplitude noise suppression etalon 52 is placed in the cavity normal to the beam, as shown in FIGS. 1, 2d, and 3. Alternatively, it may be possible to mode lock the laser to reduce noise. Using etalon 52 causes the laser to operate in single mode which is quiet. An example of an etalon 52 which can be used is an optical flat of about 0.5 mm thickness. Since the beam waist 50 is not only the narrowest portion of the beam but the portion of the beam where all the rays are parallel, it is preferred to place etalon 52 at the beam waist 50 in order to reduce optical losses. Since it is also preferred to place double 16 at waist 50, etalon 52 can be placed adjacent doubler 16 as shown in FIG. 3.

Figure 5:
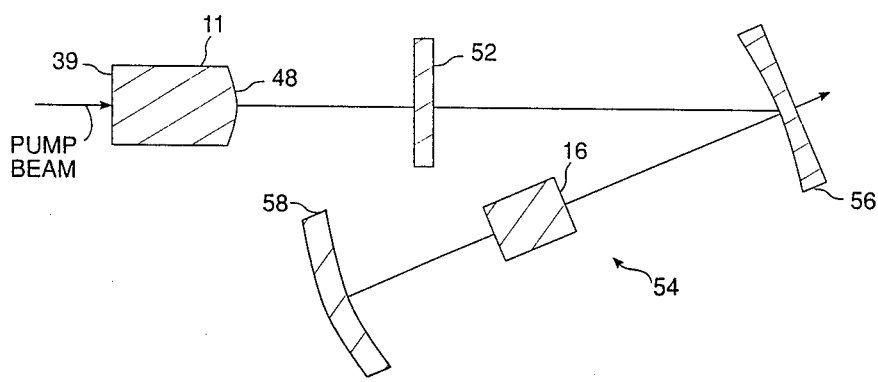
FIG. 5 is a schematic sectional view, in longitudinal orientation, of a folded cavity configuration.
Figure 6:
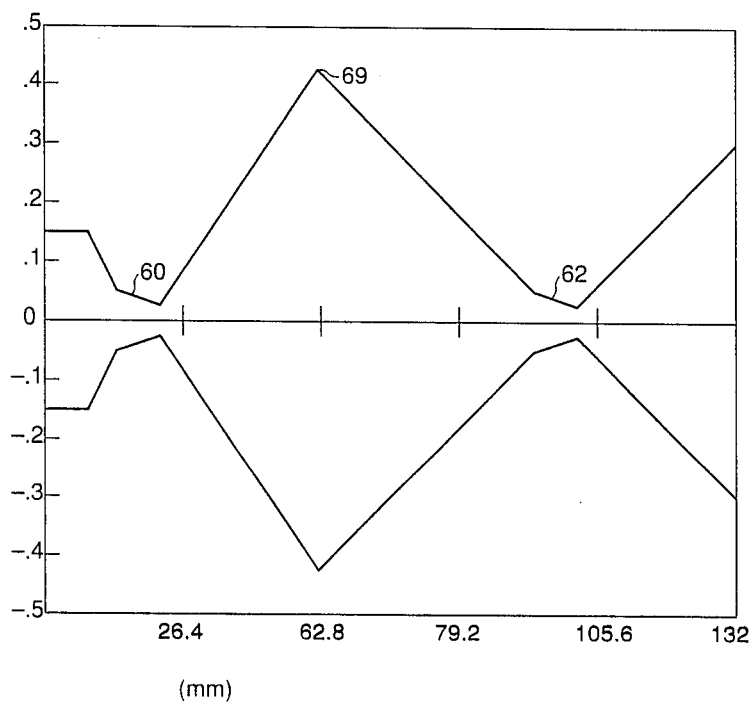
FIG. 6 is a graphic representation of the laser beam shape within the folded cavity, with a pair of beam waists.

To avoid the difficulty of placing two elements, doubler 16 and etalon 52, at beam waist 50, an alternate configuration, folded cavity 54, shown in FIG. 5, is preferred. Folded cavity 54 includes a concave folding mirror 56 which forms with rear mirror surface 39 of laser rod 11 the first arm of the laser cavity, and concave end mirror 58 which forms with folding mirror 56 the second arm of the laser cavity. Folding mirror 56 is a dichroic mirror which is highly reflective at the undoubled frequency and highly transmissive at the doubled frequency, and is used as the output coupling means for the visible light. Mirror 58 is highly reflective at both frequencies. Frequency doubler 16 is placed in the second arm between mirrors 56 and 58 so that the laser beam produced by rod 11, with the proper polarization, is reflected by mirror 56 and passe through doubler 16. The frequency doubled beam is reflected back by mirror 58 to mirror 56 through which the beam is output. The frequency doubled radiation thus does not pass back through the first arm to laser rod 11. An amplitude noise suppression etalon 52 can be placed in the first arm between mirror 56 and laser rod 11. An illustrative beam profile within the folded cavity 54 is shown graphically in FIG. 6. A first beam waist 60 is produced in the first arm and a second beam waist 62 is formed in the second arm with the profile extending between mirror surface 39 and mirror 58 with an intermediate point 64 at mirror 56. As previously described the beam width at laser rod 11 is matched to the laser diode pumping volume. Doubler 16 is placed at waist 62 while etalon 52 is placed at waist 60. Typical dimensions of the folded cavity are a total length of about 100–130 mm; the radius of curvature of mirrors 56, 58 is typically 37 mm; beam waist 60, 62 are typically less than 100 microns.

The primary cause of multi-longitudinal mode operation in a Nd:YAG laser is spatial hole burning in the active medium. Several techniques exist for eliminating spatial hole burning, including utilizing a ring laser cavity geometry or placing the active medium between quarter wave plates, which are shown in W. Koechner, *Solid State Laser Engineering,* (Springer-Verlag, New York, 1976), p. 226. Either of these techniques can be applied to the intra-cavity doubled laser system described herein, instead of using an etalon, and form additional aspects of the invention. By eliminating spatial hole burning the laser will lase with a single longitudinal mode and thus not suffer the mode instability and amplitude fluctuations described above. Utilizing a ring laser cavity geometry or a pair of quarter wave plates has the advantage that little power is lost when these elements are inserted in the cavity whereas using etalons to force single mode operation often results in a factor of two loss in power.

As previously described, in order to utilize the intracavity frequency doubler to generate a frequency doubled laser output, the output of the laser rod must be polarized to coincide with the proper axis of the doubler crystal. When a nonbirefringent material such as YAG (yttrium aluminum garnet $Y_3Al_5O_{12}$) used for the laser rod, a polarization means within the cavity is required, as previously shown. However, it is also possible to utilize a birefringent material for the laser rod; the output of the birefringent laser rod will then be polarized, without the need for polarization means, and the laser rod and doubler crystal can be properly aligned for effective frequency conversion. One suitable birefringent material for the laser rod is YLF (yttrium lithium fluoride $YLiF_4$); accordingly, Nd:YLF is also a preferred material for the invention, in addition to ND:YAG. Other non-birefringent materials such as Nd:YAP (yttrium aluminum phosphate) and birefringent materials such as Nd:YALO can also be utilized. Additional neodymium doped or other rare earth doped solid state materials may also be utilized as long as the lasing ion has an absorption range which matches the laser diode output. The present invention encompasses the use of these alternative materials, both non-birefringent and birefringent, in a manner similar to that described with reference to Nd:YAG, without the polarization means for birefringent materials, to produce a family of miniaturized, laser diode pumped, intracavity frequency doubled and non-frequency doubled solid state lasers.

In some applications, pulsed laser outputs are desired. The lasers as previously described generally operate in continuous (Cw) mode. Although it may be possible to produce a pulsed laser output by pulsing the laser diodes which pump the laser rod, the preferred method of producing pulsed output is by Q-switching. As shown in FIGS. 1 and 2D, a Q-switch 66, typically an acoustooptic or electro-optic device, is positioned in the laser cavity. A Q-switch driver 68 is operatively connected to the Q-switch 66. In operation, the Q-switch turns the laser off to allow a population inversion to build up as the laser rod is pumped by the laser diode. The Q-switch is then turned off, producing a high energy pulse as all the stored energy in the laser cavity is released in a short time. The pulse width is determined by the Q-switching frequency. For pulsed operation YLF may be the preferred material since it stores more energy (about double) than YAG. Amplitude noise is not a problem for pulsed operation. Both frequency doubled and frequency undoubled lasers can be pulsed. As an example, a laser producing 80–100 mw IR can be frequency doubled and Q-switched to produce 50 mw average power at 100 kHz green pulses.

In addition to the exemplary and preferred materials previously described, the principles of the invention are similarly applicable to any rare earth doped solid state laser material which can be made to lase when pumped with a laser diode. The invention encompasses he entire class of lasers made with any such materials. In addition to YAG, YLF, YAP and YALO ($YAlO_3$), as previously described, other particularly preferred materials include neodymium doped yttrium vanadate (Nd:YVO$_4$), neodymium doped glass including silicate and phosphate glasses (Nd:glass), Nd:BEL, and Nd:GSGG (gadolinium scandium gallium garnet). In addition to neodymium, erbium and holmium are two other preferred dopants. Other suitable laser rod materials and dopants are listed in *CRC Handbook of Laser Science and Technology,* Vol. I Lasers and Masers, Ed. M. J. Weber, CRC Press Inc., Boca Raton, Fla., 1982, Section 2: Solid State Lasers, Table 2.1.1.2 Laser Crystals, pp. 74–114, which is herein incorporated by reference. Suitable laser glasses include LG-650 and LG-660 silicate glasses made by Schott Optical Glass, Duryea, Pa, and LG-700 (Schott) and LHG-8 (Hoya Corp., Tokyo, Japan) phosphate glasses. These and other suitable glasses are listed in the same CRC Handbook of Laser Science and Technology, Table 2.3.12, pp. 249–254, which is herein incorporated by reference.

One of the most significant aspects of the invention is the laser diode pumping scheme for efficiently longitudinally end pumping the laser rod while matching the laser mode volume to the pumping volume. Ideally a single spatial mode laser diode (single emitter) could be used; however, in practice these laser diodes are too low power. Accordingly, a laser diode array as previously described, in which a plurality of diode emitters (typically 10 or more) are phase locked together are a preferred source. The higher power of the array is sufficient, despite the multi-spatial mode output, since the array beam can be suitably focused into the laser rod. Now there is a new type of laser diode available, a multi-spatial mode extended emitter laser diode which has a wide or broad emitting stripe or active area and produces a high power multi-spatial mode output. These extended emitter laser diodes are exemplified by Sony Model Nos. SLD 301V and SLD 301w having output power of 100 mw; SLD 302V and w(200 mW); SLD 303V and w (500 mW); SLD 304V and w (1000 mW), as described in Sony News and Information Bulletin No. 87S-013, 1987, which is herein incorporated by reference. These diodes are compact and high efficiency and have a tunable wavelength in the range of 770–840 nm. Although there is a divergence problem and the far field beam pattern is unsuitable because of the multi-spatial mode output, it is possible to suitably focus the near field pattern to end pump the laser rod and match the TEMOO mode of the laser cavity, as previously described. Thus these multi-spatial mode extended emitter laser diodes form another preferred pumping source according to the invention.

Figure 7A:
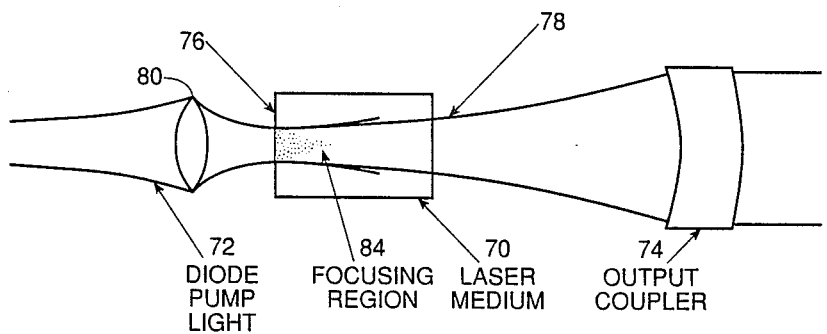
FIGS. 7a–b illustrate the mode matching pumping scheme of the invention in which the region of pump light absorption in the focused pump volume is matched to the cavity mode volume.
Figure 7B:
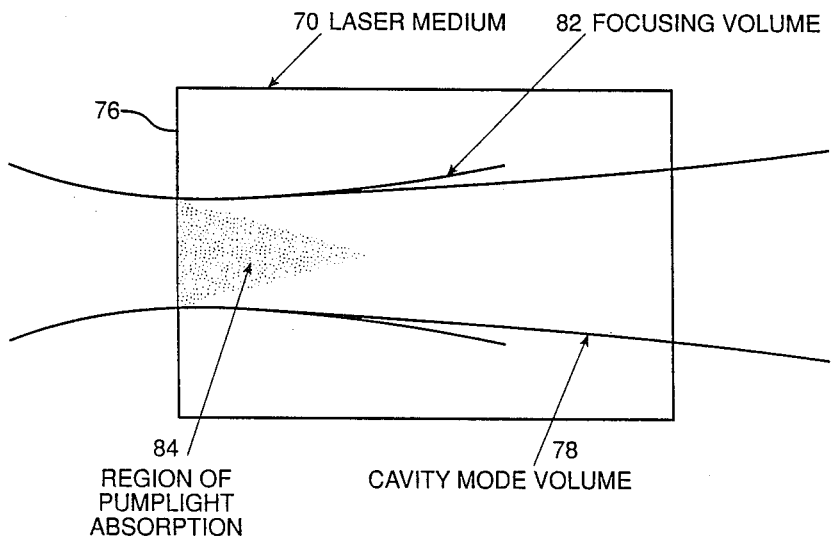

The diode pumping and mode matching feature of the invention is further illustrated with reference to FIGS. 7A and B in which a laser beam medium (rod) 70 is pumped by a laser diode beam 72, which may be from an array or extended emitted diode. The laser cavity is formed by output coupler 74 and end face 76 of rod 70; within the cavity each spatial mode occupies a certain mode volume 78. Preferably the laser is operated in TEMOO mode so the pumping volume is matched to the TEMOO mode volume. Diode pump beam 72 is coupled into laser rod 70 using fast lens 80 to mode match the pump volume (focusing volume) 82 with the desired mode volume 78 of the laser cavity. Most of the pump radiation is absorbed in an absorption region 84 near end face 76 within the focusing volume 82. By matching the cavity mode volume 78 with this region 84 of pump light absorption, the maximum absorption of the pump wavelength takes place within the laser mode volume. This approach ensures maximum coupling efficiency of the pump light into the laser medium and optimizes laser operation in TEMOO mode. Thus the pumping scheme matches the desired mode (usually TEMOO) to the region of the pump light absorption in the laser rod, and produces a single spatial mode output of relatively high power using a relatively low power pumping source.

Changes and modifications in the specifically described embodiments can be carried out without departing from the scope of the invention which is intended to be limited only by the scope of the appended claims.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An efficient, laser diode pumped solid state laser comprising:
    a doped solid laser rod supported in a housing,
    a pumping light source supported in said housing having at least one laser diode, the output of said pumping light source including a frequency which matches an absorption line exciting the rod and having an extended spatial structure limiting the focusability of said output,
    means for focussing the spatially extended output onto the rod, and
    laser cavity means surrounding the rod, said means including output coupler means and means for adjusting the volume of the mode in said rod to match the focused output of the pumping means to enhance the absorption of the spatially extended output as focused.

2. A laser according to claim 1 wherein the pumping light source includes a laser diode array.

3. A laser according to claim 2 wherein the laser diode array is a Ga Al As array.

4. A laser according to claim 1 wherein the output of said pumping light source includes a 0.808 micron wavelength.

5. A laser according to claim 4 wherein the output is tunable by temperature control means.

6. A laser according to claim 1 wherein the output of said pumping light source includes a plurality of overlapping beams.

7. A laser according to claim 1 wherein the rod has a front end and a back end and the output is focused upon an end of the rod.

8. A laser according to claim 1 wherein said rod is doped with a rare earth.

9. A laser according to claim 8 wherein the rod is made substantially of any one of the group consisting of YAG, YALO, YLF, YLF, YAP, BEL, GSGG, vanadate, silicate glasses and phosphate glasses.

10. A laser according to claim 1 wherein the overall efficiency exceeds nearly 6%.

11. A laser according to claim 11 wherein the volume of the mode in the rod is sufficiently large enough to well match the output of the pumping light source, within the rod.

12. A laser according to claim 1 wherein the laser cavity means further includes a convexly-formed front end surface on the laser rod.

13. A laser according to claim 1 further comprising a frequency doubler within the laser cavity to receive laser light from the rod and double its frequency.

14. A laser according to claim 13 wherein the frequency doubler is situated at the waist of a beam formed by the laser light from the rod.

15. A laser according to claim 1 wherein laser light from the rod includes a number of different modes.

16. A laser according to claim 1 wherein laser light from the rod is in a TEMoo mode.

17. A laser according to claim 1 wherein said focussing means includes a collimating lens and a focussing lens.

18. An efficient, laser diode pumped solid state laser comprising:
    a neodymium-YAG laser rod supported in a housing,
    a pumping light source supported in said housing having at least one laser diode, the output of said pumping light source including a frequency which matches an absorption line exciting the rod and having an extended spatial structure limiting the focusability of said output,
    means for focussing the spatially extended output onto the rod, and
    laser cavity means surrounding the rod, said means including output coupler means and means for adjusting the volume of the mode in said rod to be sufficiently large enough to match the focused output of the pumping means within the rod so that the power of said pumping light is used efficiently to excite the rod and produce laser light from the rod.

19. A laser according to claim 18 further comprising a frequency doubler within the laser cavity to receive the laser light from the rod and double its frequency, and polarization control means for adjusting the polarization of the laser light to optimize the operation of the frequency doubler.

* * * * *